W. H. HIESTAND.
TARGET TRAP.
APPLICATION FILED JUNE 19, 1909.
938,861.
Patented Nov. 2, 1909.
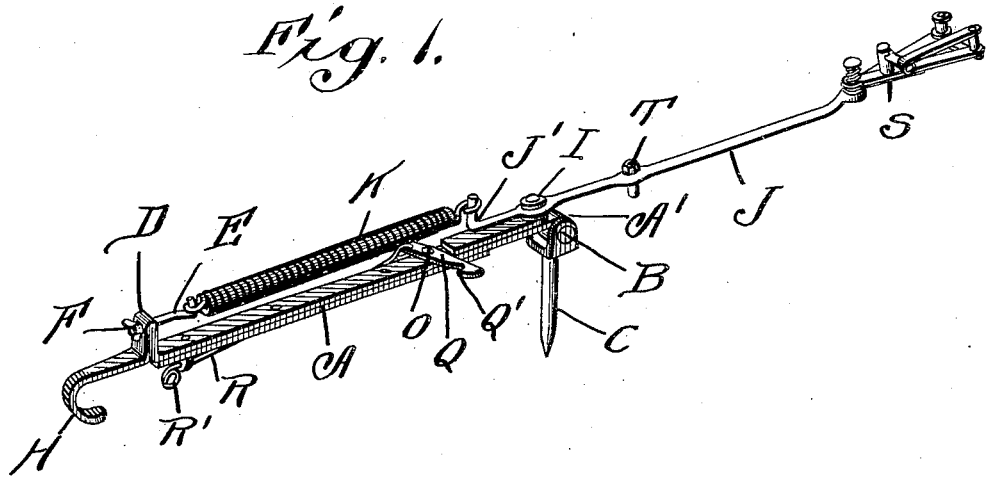
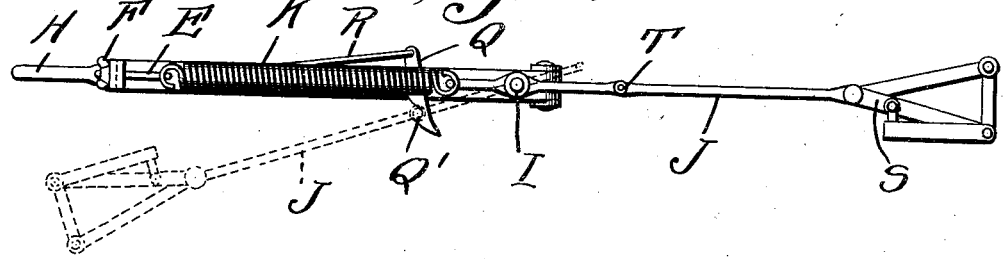
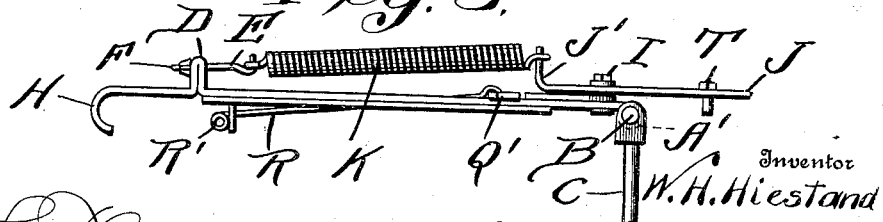
Witnesses
Geo L Thom
A. L. Hoyt
Inventor
W. H. Hiestand
By Franklin N. Hoyt
Attorney

UNITED STATES PATENT OFFICE.

WILLIAM H. HIESTAND, OF CHICAGO, ILLINOIS.

TARGET-TRAP.

938,861. Specification of Letters Patent. Patented Nov. 2, 1909.

Application filed June 19, 1909. Serial No. 503,245.

*To all whom it may concern:*

Be it known that I, WILLIAM H. HIESTAND, a citizen of the United States, residing at Chicago, in the county of Cook and State of Illinois, have invented certain new and useful Improvements in Target-Traps; and I do hereby declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to new and useful improvements in target traps and comprises a simple and efficient device of this nature having various details of construction, combinations and arrangements of parts which will be hereinafter fully described and then specifically defined in the appended claim.

I illustrate my invention in the accompanying drawings, in which:—

Figure 1 is a perspective view illustrating a trap with the spring-actuated throwing arm at its farthest outer throw. Fig. 2 is a top plan view of the apparatus showing the are in dotted lines in its retraced position or set in readiness to be sprung, and Fig. 3 is an edge view of a portion of the apparatus.

Reference now being had to the details of the drawings by letter, A designates a bar which is bent upon itself and formed into a cylindrical roll A′ through which a pivot B passes, and C designates a forked member in which said pivot is mounted, the pointed shank portion of said member being adapted to be inserted in a suitable supporting device when in operation. The bar is bent to form an upwardly projecting portion D and is apertured for the reception of the hook E, one end of which is threaded for the reception of the winged nut F. One end of the bar A is bent to form a handle H whereby it may be conveniently gripped when the operator springs the trap.

Pivotally mounted upon the pin I is a throw arm J and K designates a spring which is fastened at one end to the hook E and its other end is connected to a hook J′ formed at the end of the throw arm J. Pivotally mounted upon a pin O carried by a bar A is a latch Q having a hook Q′ near its free end, and R designates a rod pivotally connected to said latch and its other end is angled to form an eye R′ adapted to receive the finger of an operator to give the same a longitudinal movement. Pivotally mounted upon the end of the throw arm is the spring-actuated target holder S adapted to hold the target and T is a pin carried by the throw arm J and adapted to engage the latch in the manner shown in dotted lines in Fig. 2 to hold the trap set.

In operation, the device being properly mounted is set by swinging the arm from the position shown in Fig. 1 in solid lines to that shown in dotted lines in Fig. 2, in which position it is held set by means of the latch O. The trap is sprung by the operator pulling on the rod R in a direction toward the handle H sufficiently to cause the latch to be released from the pin T, thereby allowing the spring K, which is put under tension as the trap is set, to cause the throw arm J to swing forcibly out to the position shown in Fig. 1, thereby giving an impetus to the target as will be readily understood.

By the provision of a target trap as shown and described, it will be noted that a simple and efficient device is afforded which may be reduced to a compact and convenient shape for transportation and for convenience in storage, etc.

What I claim to be new is:—

A target trap comprising a bar bent at one end to form a bearing, a pivot mounted in said bearing, a support for said pivot, said bar being bent upon itself forming a right angled projection therefor and apertured, the adjacent end of said bar being bent to form a handle, a pin rising from said bar adjacent to its pivotal end, a throw arm pivotally mounted upon said pin, one end of said throw arm being angled, a spring fastened at one end to the angled end of the throw arm, a hook connected to the other end of the spring and having a threaded shank portion extending through the registering apertures in the portion of the bar which is bent upon itself, a thumb nut for adjusting said screw to regulate the tension of the spring, a latch pivotally mounted upon said bar, a rod pivoted to one end of said latch and its other end turned to form an eye, and a pin projecting from said throw arm and adapted to engage said latch.

In testimony whereof I hereunto affix my signature in the presence of two witnesses.

WILLIAM H. HIESTAND.

Witnesses:
FREDERIC PETTEBONE,
JOSEPH F. DEVEREUX.